O. W. RICE.
WATER CLOSET CONNECTION.
APPLICATION FILED APR. 14, 1915.
1,152,973.　　　　　　　　　　Patented Sept. 7, 1915.
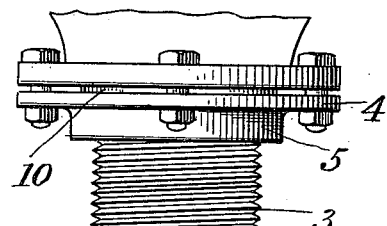
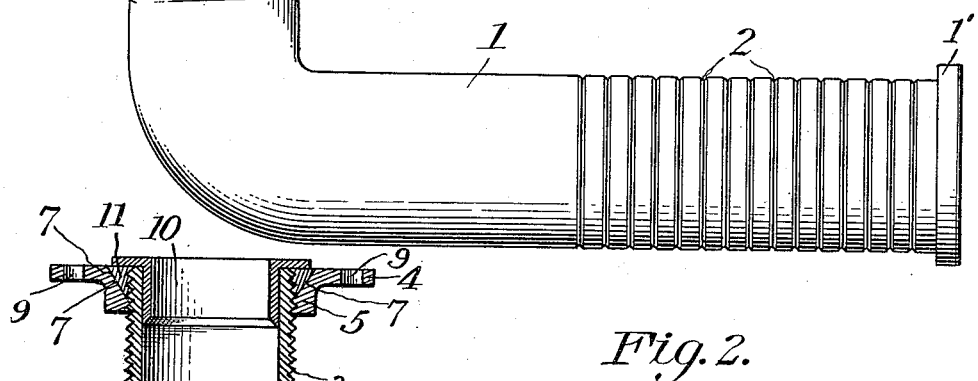
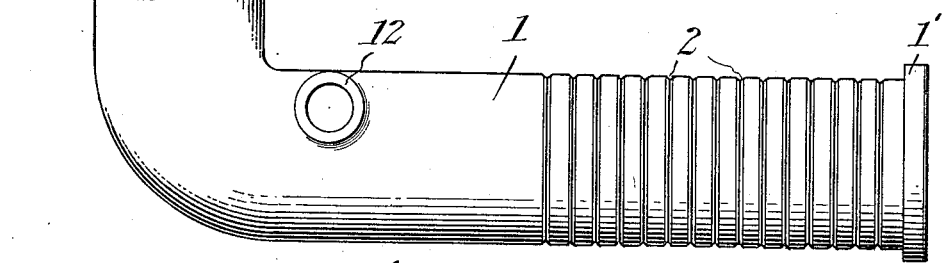
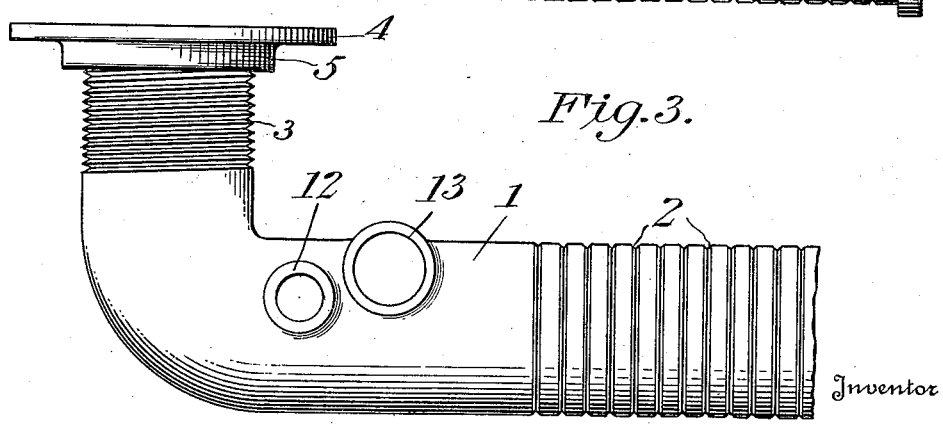
Witnesses　　　　　　　　Inventor
Fenton M Belt　　　　　　Oscar W. Rice
J. W. Sherwood　　　By　Franklin H. Hough
　　　　　　　　　　　　　Attorney

UNITED STATES PATENT OFFICE.

OSCAR W. RICE, OF ROCHESTER, NEW YORK, ASSIGNOR TO THE EDWARD J. RICE MFG. CO., OF ROCHESTER, NEW YORK, A CORPORATION.

WATER-CLOSET CONNECTION.

1,152,973. Specification of Letters Patent. Patented Sept. 7, 1915.

Application filed April 14, 1915. Serial No. 21,345.

*To all whom it may concern:*

Be it known that I, OSCAR W. RICE, a citizen of the United States, residing at Rochester, in the county of Monroe and State of New York, have invented certain new and useful Improvements in Water-Closet Connections; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in water closet connections and consists in the provision of a one-piece bend, circumferentially threaded at one end and having the straight portion thereof corrugated in the usual manner as a convenience for cutting off the bend for different locations.

My invention consists further in the provision, in connection with a bend of this nature, of an adjustable ring which is mounted upon a threaded portion of the bend and adapted to be securely held to a closet.

My invention comprises various details of construction, combinations and arrangements of parts which will be hereinafter fully described, shown in the accompanying drawings and then specifically defined in the appended claims.

I illustrate my invention in the accompanying drawings, in which:

Figure 1 is a side elevation of the closet connection. Fig. 2 is a central sectional view through a portion of the bend. Fig. 3 is a side elevation showing waste and ventilation openings therein.

Reference now being had to the details of the drawings by numeral, 1 designates a bend having corrugations 2, forming a convenient means whereby the bend may be cut off for different locations, adapting it for different conditions and said bend has a circumferentially threaded portion 3.

The connecting ring 4 is provided with an integral flange 5, interiorly threaded to engage the threads 3 upon the bend, said ring having a portion of the wall of the opening therein beveled as at 7. The ring is of the usual construction and provided with slots 9 for attachment to the closet, and 10 designates a gasket which fits over the joint intermediate the threaded portions of the ring and bend and telescopes within the latter and is provided for the purpose of forming a water tight joint. The annular space 11 intermediate the beveled portion of the ring and the threaded part of the bend is filled with lead or other suitable packing, thus securely holding the parts together.

In Fig. 2 I have shown waste openings 12 and in Fig. 3 have shown, besides the waste connecting openings 12, ventilation openings 13, both of which are formed above the longitudinal center of the pipe.

By the provision of a closet bend made in accordance with my invention, it will be noted that the upright portion of the bend may be cut off the desired length and the ring or flange adjusted upon the threaded part of the bend and afterward the annular space filled with lead or other suitable packing, thus securely holding the parts together, whereby an absolutely hermetically sealed joint is provided and a rigid and firm connection afforded between the bend and closet.

What I claim as new is:

1. A water closet connection comprising a bend, circumferentially threaded about one end thereof, a flanged ring having its inner circumference beveled a portion of the width of the opening therein and the balance threaded, the latter portion adapted for engagement with the threads of the bend, a filler intermediate the beveled wall of the opening and the threads of the bend and its upper end flush with the face of the flange of said ring, and a gasket fitting over the threaded end of the bend and said filler.

2. A water closet connection comprising a bend, one end of the bend being circumferentially threaded, a flanged ring, the wall of the opening of which is beveled partially the depth of the ring and the balance interiorly threaded for engagement with said threads, and a flanged gasket telescoping within the bend and engaging over the end of the latter.

In testimony whereof I hereunto affix my signature in presence of two witnesses.

OSCAR W. RICE.

Witnesses:
FRANKLIN H. HOUGH,
A. R. FOWLER.

Copies of this patent may be obtained for five cents each, by addressing the "Commissioner of Patents, Washington, D. C."